JOSEPH PIGNONE
INVENTOR.

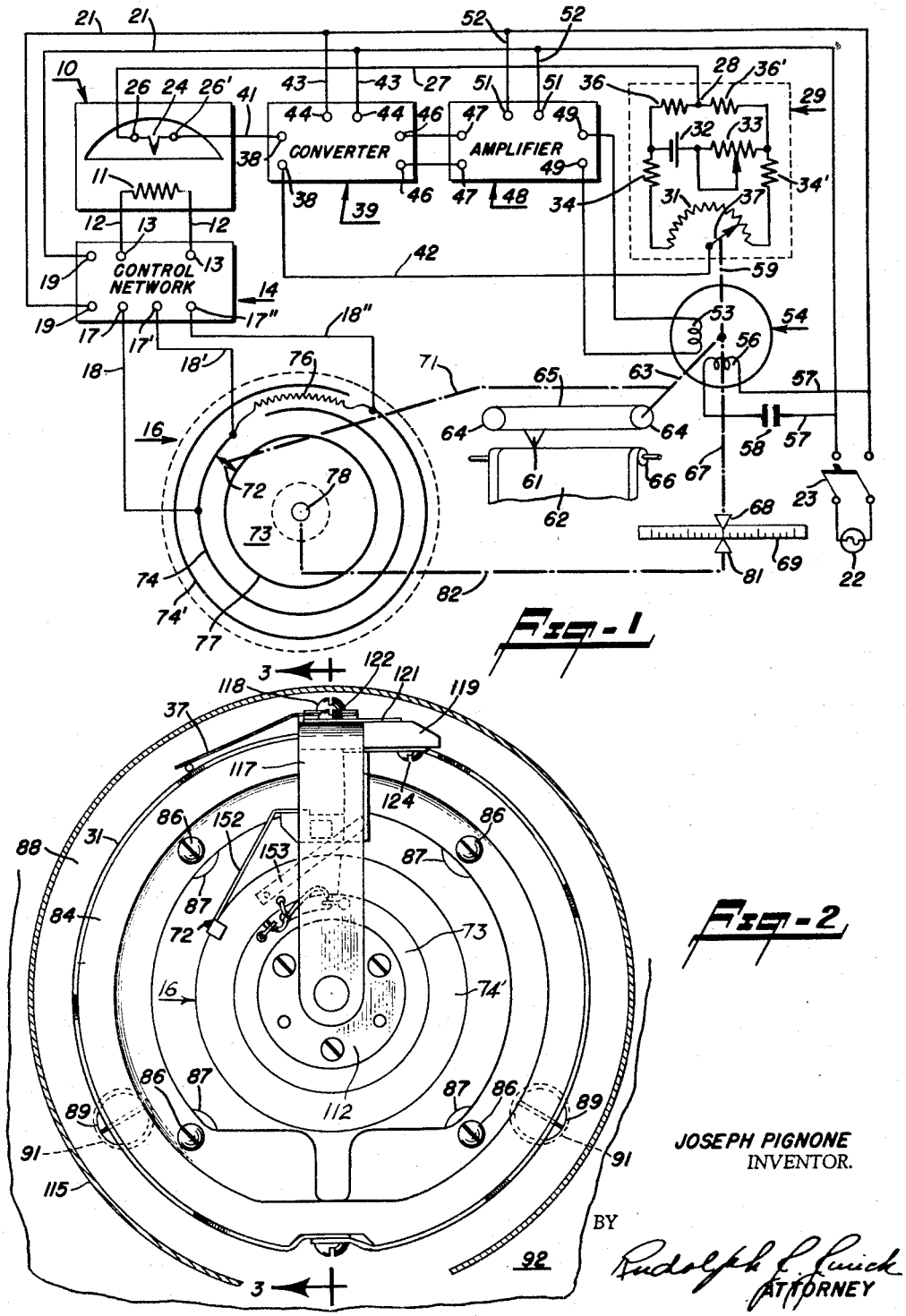

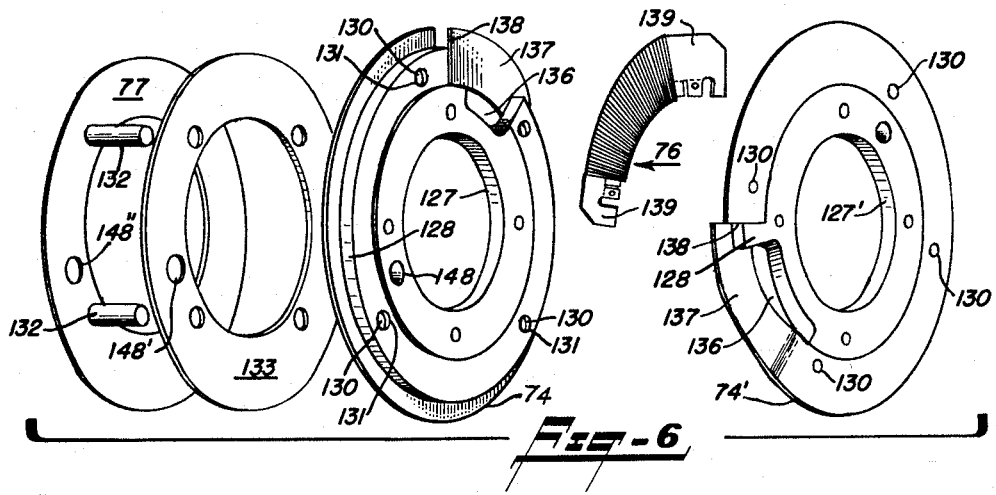
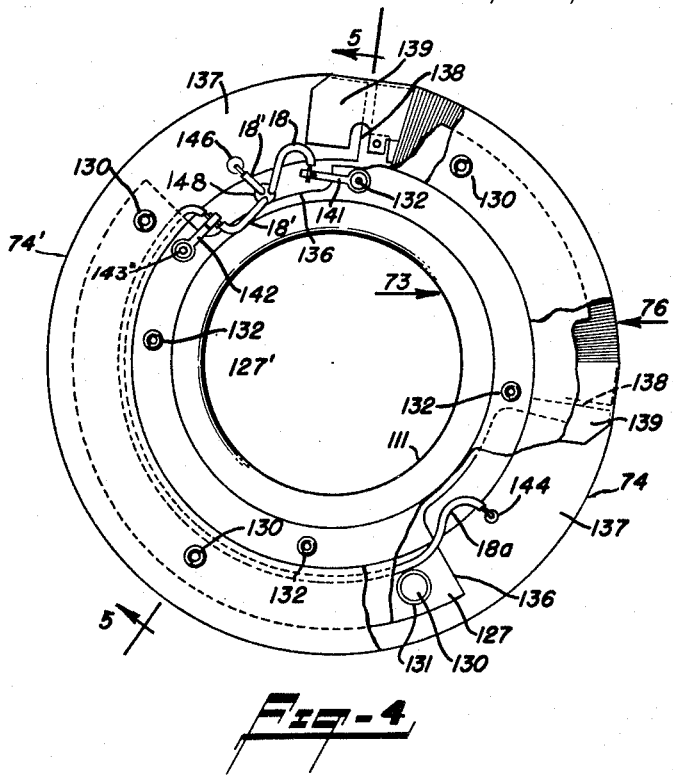
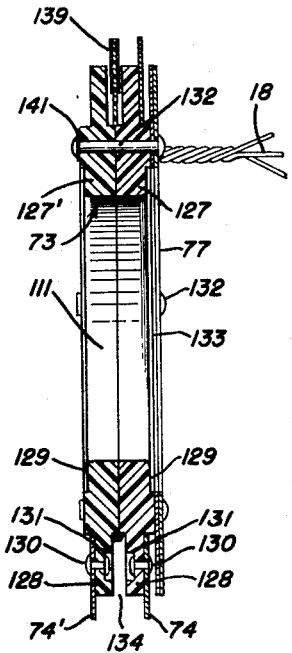

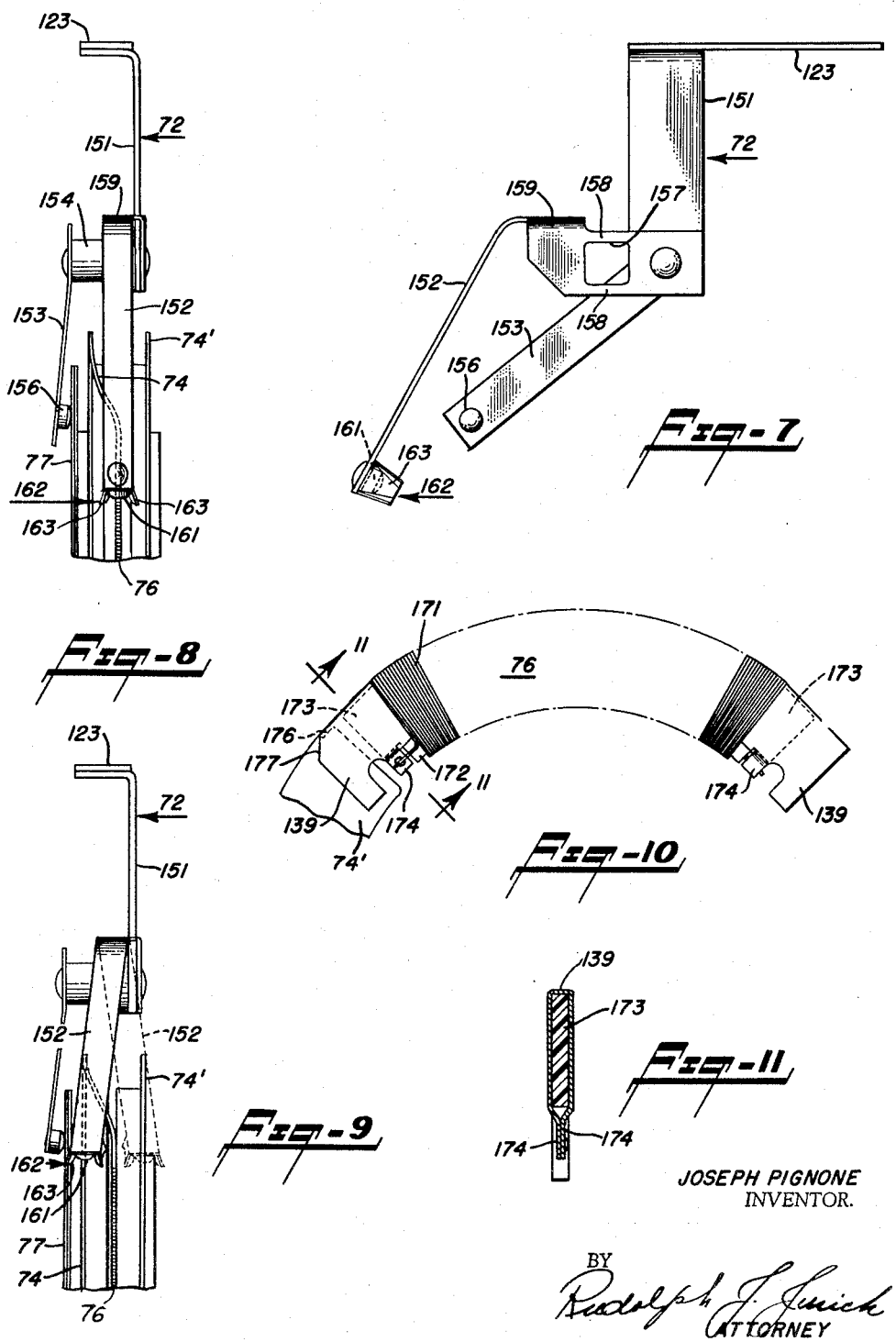

United States Patent Office

2,934,735
Patented Apr. 26, 1960

2,934,735

SEGMENTAL SLIDEWIRE RESISTOR

Joseph Pignone, West Orange, N.J., assignor, by mesne assignments, to Daystrom, Incorporated, Murray Hill, N.J., a corporation of New Jersey Application July 22, 1957, Serial No. 673,374

13 Claims. (Cl. 338—176)

This invention relates to a segmental slide wire device, and more particularly to an adjustable segmental slide wire which may be used on a measuring instrument for proportional control of the magnitude of the condition being measured.

Measuring, or measuring and recording, instruments with which my novel segmental slide wire device is adapted to be used are designed to measure, or measure and record, the output from such primary sources as; thermocouples, tachometer generators, photoelectric cells, resistance thermometer bulbs, or any other transducer or converter that provides an electrical output which varies in accordance with changes in a condition to be measured. Such instruments may be employed to measure flow, temperature, pressure, weight, and the like, by using suitable converters to provide an electrical output. For purposes of illustration, the segmental slide wire is described herein for proportional control of the temperature of a furnace. Obviously, other variable conditions may be controlled by the use of my device.

The measuring and recording instrument may employ one of several types of circuitry, including potentiometric, Wheatstone bridge, and current balancing circuits. For purposes of illustration, the segmental slide wire of my invention is described herein as used in conjunction with a potentiometric type instrument to control the temperature of a furnace. It will be apparent that the segmental slide wire may be used on other types of instruments employing different type balancing circuits.

The segmental slide wire device comprises a pair of generally circular tracks having an arcuate resistance element mounted between two ends thereof. A brush is adapted to contact the tracks and resistance element. The tracks and attached resistance element and the brush are mounted for rotation about a common axis. The brush is rotated to a position dependent upon the value of the condition under measurement, the brush being rotated in one direction or the other with each change in the magnitude of the condition. The tracks and attached resistance element assembly is adjustable about the axis to any desired point within the operating range of the instrument. Thus, my novel segmental slide wire device is adapted to provide a proportional control function at any desired point within the operating range of the instrument; proportional control not being limited to any predetermined portion of the instrument operating range. A novel adjusting mechanism which may be used for adjustably positioning the segmental slide wire is shown in my co-pending United States patent application Serial Number 677,602, filed August 12, 1957. This present patent application, however, is directed, primarily, to my novel segmental slide wire device for use on any type measuring instrument, and with any suitable adjusting mechanism.

Connection between the tracks and the resistance element is made by the use of novel U-shaped clips which extend over the end of the track and adjacent end of the segmental resistance element. The resistance segmental resistance slide wire is accurately and quickly fastened between the tracks by use of the U-shaped end clips.

The tracks and segmental slide wire are supported upon a main body comprising two identical annular-shaped members which are preferably molded of insulating material. The two annular-shaped members are provided with angularly displaced peripheral notches through which the conducting tracks extend, whereby the slide wire and a major portion of each of the tracks are positioned in axially disposed planes; the segmental slide wire being positioned on a plane between the planes of the major portion of each track.

A novel brush assembly is utilized to contact the axially disposed tracks and slide wire. One brush arm on the brush assembly, which assembly is rotatable in a plane perpendicular to the axis of rotation of the tracks, is provided with a yoke adjacent the end thereof, which straddles the contacting tracks or slide wire whereby the end of the brush may be axially displaced as the brush is rotated relative to the tracks. A hole formed in the side of the brush member localizes the axial flexure, or bending, of the brush.

An object of this invention is the provision of a segmental slide wire device for use on a measuring instrument for proportional control of the condition under measurement.

An object of this invention is the provision of a segmental slide wire device for use on a measuring instrument, which segmental slide wire is readily mounted on the instrument, and is adjustable for proportional control of the condition under measurement at any desired point within the operating range of the instrument.

An object of this invention is the provision of a segmental slide wire device comprising a pair of generally circular conductive tracks coaxially mounted upon a carrying shaft, the said tracks being spaced apart axially, one end of each of the said tracks being displaced axially and positioned in a spaced end-to-end relation, and a resistance element attached between the said spaced ends of the said tracks.

An object of this invention is the provision of a segmental slide wire device comprising a pair of identically-shaped insulating body members each having a cut-out portion along the periphery thereof, a pair of generally circular conductive tracks mounted upon one side of each of the said pair of body members, and having a portion extending through the said cut-out portions, two ends of the said pair of tracks being positioned in a spaced end-to-end relation, a resistance element attached between the said spaced ends of the said tracks, and means joining the said pair of body members together.

An object of this invention is the provision of a novel brush mounted for rotary movement about an axis, the said brush being provided with a yoke member mounted adjacent the end thereof for straddling engagement with a generally circular track having an axially displaced portion thereon; displacement of the contacting end of the said brush being localized by reason of an opening formed in the side thereof.

An object of this invention is the provision of a novel U-shaped clip member for accurately and quickly joining the end of a track to the end of a resistance element.

These and other objects and advantages will become apparent from the following description when taken with the accompanying drawings. It will be understood that the drawings are for purposes of illustration, and are not to be construed as defining the scope or limits of the invention, reference being had for the latter purposes to the appended claims.

In the drawings, wherein like reference characters denote like parts in the several views;

Figure 1 is a diagrammatic presentation of a potentiometric recorder circuit and showing my novel segmental slide wire device connected for proportional control of the temperature of a furnace;

Figure 2 is a fragmentary rear elevational view of a potentiometric type measuring and recording instrument and showing my novel segmental slide wire device mounted on the shaft which carries the slider of the potentiometer;

Figure 4 is an enlarged rear elevational view of the segmental slide wire device, with parts broken away for clarity;

Figure 5 is an enlarged sectional view taken on line 5—5 of Figure 4;

Figure 6 is an exploded perspective view of my novel segmental slide wire device showing the tracks, resistance element and two-piece insulating body member;

Figure 7 is a front elevational view of a novel brush construction for use in my segmental slide wire device;

Figure 8 is a side view of the brush shown in Figure 7 and showing the brush contacting the resistance element of the segmental slide wire device;

Figure 9 is a view which is similar to Figure 8 only showing the brush displaced in one direction in solid lines and displaced in the opposite direction in broken lines;

Figure 10 is an enlarged front elevational view of my novel resistance element with U-shaped attaching clips fastened thereto; and Figure 11 is a sectional view taken on line 11—11 of Figure 10.

Figure 3:
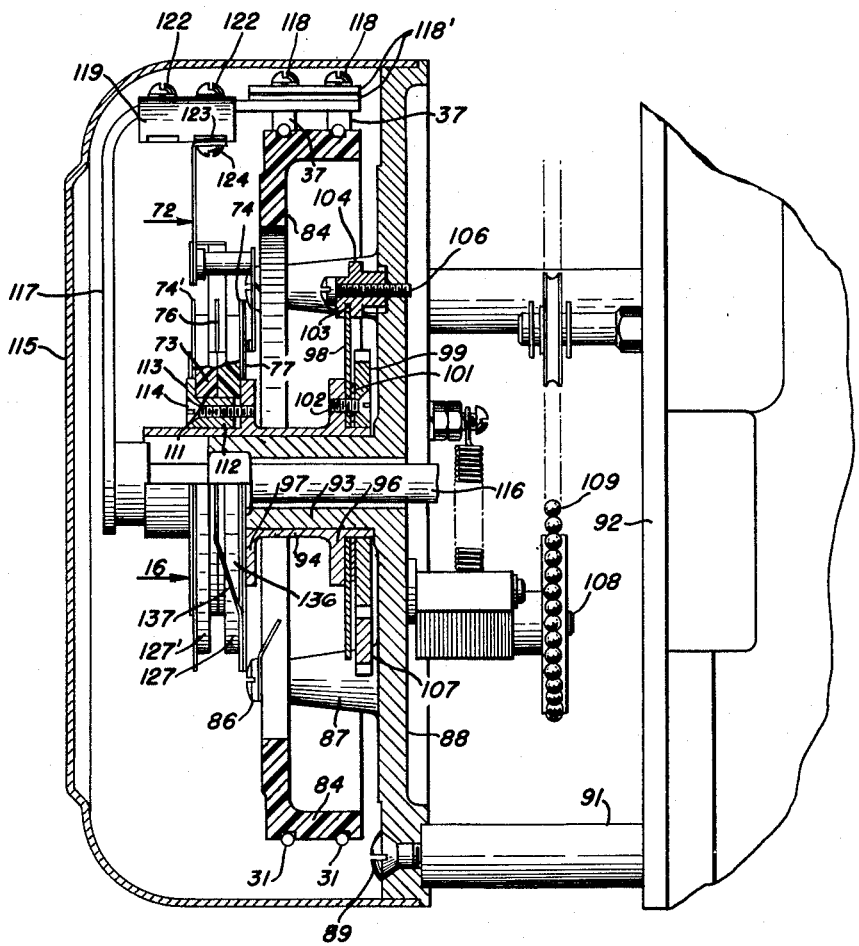
Figure 3 is a fragmentary side view, with parts in elevation and parts in vertical section on line 3—3 of Figure 2.

Reference is now made to Figure 1 of the drawings wherein there is shown a furnace 10 having a resistance heating element 11, positioned therein, which element is connected through lead wires 12 to terminals 13 of a control network 14. My novel segmental slide wire device, designated generally 16, is connected to terminals 17, 17' and 17" of the control network 14 through lead wires 18, 18' and 18", respectively. Terminals 19 of the control network 14 are connected by line wires 21 to a source of alternating potential 22, through a double-pole line switch 23. The control network 14 regulates the amount of current flow through the heating element 11, thereby regulating the temperature of the furnace 10.

Typically, the segmental slide wire device 16 is connected as one leg of a D.-C. bridge circuit in the control network 14; the associated elements in the network 14 including a polarized detector and a motor. The terminals 19, within the network 14, may be connected to the primary winding of a variable transformer, and the terminals 13 connected to the secondary winding thereof. The motor in the network may be connected through suitable mechanical linkage to the variable transformer to control the voltage at the secondary winding and, thus, at the output terminals 13. None of the above described electrical components of the control network 14 are shown in detail since the network forms no part of this invention. It will be understood that, within the range of proportional control of the slide wire device 16, the current which is supplied to the heating element 11 varies with changes in the temperature of the furnace.

The temperature of the furnace is measured by a thermocouple 24 located within the furnace. One terminal 26 of the thermocouple 24 is connected through a lead wire 27 to one terminal 28 of a null-point potentiometric network 29. The potentiometric network includes a circular resistance wire 31 connected across a source of fixed voltage, such as a battery 32, through an adjustable resistor 33 and fixed resistors 34 and 34'. The lead wire 27 from the thermocouple is connected through fixed resistors 36 and 36' to the network. The thermocouple voltage is opposed to the potential drop across a variable portion of the slide wire 31 as determined by the position of a rotatable contact 37.

The potential unbalance between the thermocouple 24 and the voltage derived from the potentiometric network 29 is fed to the input terminals 38 of a converter 39 through a lead wire 41 from the other terminal 26' of the thermocouple 24, and a lead wire 42 from the rotatable potentiometer arm 37. The converter 39, which is not shown in detail, may be of any suitable type, such as a vibrator. A typical vibrator includes a movable contact which is actuated in opposite directions to alternately make and break electrical contact with a pair of spaced fixed contacts. Vibration of the movable contact is obtained by use of the source of alternating potential 22 which is connected through lead wires 43 to terminals 44 in the vibrator. The vibrator opens and closes the series connected thermocouple and potentiometric network circuits at the frequency of the alternating potential source 22. By use of a suitably connected transformer, having a center-tapped primary winding in the vibrator, the potential unbalance between the thermocouple and potentiometric network is converted to a pulsating potential at the vibrator output terminals 46.

The vibrator output terminals 46 are connected to the input terminals 47 of an amplifier 48, where the potential unbalance is amplified and appears at the amplifier output terminals 49. Supply potentials for the amplifier are supplied by the source of alternating potential 22 which is connected to the terminals 51 of the amplifier through lead wires 52. Any suitable amplifier circuitry may be used. The output terminals 49 of the amplifier 48 are connected to the control winding 53 of a two-phase, reversible, control motor 54. The reference winding 56 of the motor is connected to the source of alternating potential 22 through lead wires 57 and a capacitor 58. The motor 54 will thus be energized for rotation in one direction or the other, depending upon the phase of the current in the control winding 53 with respect to the current in the reference winding 56 which, in turn, will depend upon the direction of unbalance of the potentiometric circuit 29, as will be well understood by those skilled in this art. The motor is connected, through suitable linkage 59 to the rotatable contact 37 in the potentiometric network, and moves the contact in a direction to rebalance the potentiometric system; the resulting balance point corresponding to the temperature of the furnace 10.

The motor 54, in addition to driving the potentiometer contact 37, also serves to move a pen, or stylus, 61 across a chart 62, as by means of mechanical linkage 63, pulleys 64, and drive cable 65. The chart 62 is driven in a conventional manner as by a power-driven roller 66. The motor 54, through the connection 67, also moves an indicating pointer 68 along a calibrated temperature scale 69 whereby a visual indication of the temperature is provided. As indicated at 71, the motor 54 is also mechanically coupled to a movable brush member 72 in my novel segmental slide wire device 16.

As seen in the diagrammatic presentation of Figure 1, the slide wire device 16 comprises a body member 73, which is made of insulating material, and upon which a pair of generally circular conductive tracks 74 and 74' are mounted. A segmental resistance element 76 is connected between the ends of the tracks 74, 74'. A third, circular, conductive track, or collector ring, 77 is also mounted on the insulating body 73. The tracks 77, 74 and 74' are connected through lead wires 18, 18' and 18" to the terminals 17, 17' and 17", respectively, in the control network 14.

Both the brush member 72 and the body member 73, with its attached conductive tracks and slide wire, are rotatable about the axis designated 78; the brush member 72 being rotated by the reversible motor 54 through the linkage 71, as described above, and the body member 73 being manually rotatably adjustable by any suitable means, not shown in Figure 1. The relative rotary position between the brush member 72 and the body member 73, and attached tracks and slide wire, determines the position of the brush member on the tracks 74, 74' and segmental slide wire element 76. In Figure 1 of the drawings, for example, the brush member 72 is shown connecting the contact ring 77 to the track 74. One arm of the brush member 72 maintains continuous contact with the contact ring 77 while the other arm thereof is adapted to contact the track 74, as shown in Figure 1, the segmental slide wire element 76, or the track 74', depending upon the relative angular position of the brush with the tracks and slide wire. The range of proportional control of the device is determined by the arcuate length of the segmental slide wire 76. Proportional control of the furnace is effected only when the brush member 72 contacts the segmental slide wire 76, as the tracks 74, and 74' are of highly conductive, low resistance, material. The nominal operating point of my segmental slide wire device is indicated by a pointer, or index, 81, which is mechanically coupled through linkage 82 to the insulating body 73 of the slide wire device. Details of the segmental slide wire device 16, and its operation, are described below.

Reference is now made to Figures 2 and 3 of the drawings, wherein fragmentary rear and side views, respectively, of a recording instrument are shown upon which my novel segmental slide wire device 16 is mounted. As seen in Figures 2 and 3, the circular resistance wire 31 is mounted upon an insulating ring 84 which, in turn, is supported by means of screws 86 on posts 87 extending from a generally circular shaped casting 88. The casting 88, is, in turn, secured by screws 89 to posts 91 extending from the rear panel 92 of the recording instrument. Outstanding from the central portion of the casting 88 is a hollow cylindrical portion, or hub 93, carrying a bushing 94, as seen in Figure 3. The bushing 94 is provided with a radial flange 96 a short, spaced, distance from its inner end, and an intermediate radial flange 97. The flange 96 carries a guide plate 98 and a gear wheel 99, which are separated by a washer 101. The guide plate, gear, and washer are fitted over the bushing extension beyond the flange 96, and secured to the flange by suitable means such as screws 102. The edge of the guide plate 98 is positioned in a groove 103 in a keeper member 104 secured to the casting 88 by a screw 106. The guide plate and keeper serve to keep the bushing 94 on the hub 93. The gear wheel 99 engages a drive gear 107 which is suitably secured to a shaft 108. The shaft 108 is adapted to be manually rotated through a chain drive mechanism, designated 109, for manual adjustment of the bushing 94 upon the hub 93. Details of the manual adjusting mechanism are described in my above mentioned co-pending United States patent application Serial Number 677,602. For purposes of description in this present application, it will be understood that the bushing 94 may be rotatably positioned upon the hub 93 within a range of substantially 360 degrees.

The intermediate radial flange 97 on the bushing 94 serves as a mounting for the segmental slide wire device 16. The insulating body portion 73 of the segmental slide wire device is provided with an aperture 111 within which the body portion of a clamping ring, or mounting member, 112 fits. The clamping ring 112 is provided with an integral radial flange 113 which, when in place, clamps over the outer face of the insulating body 73 of the segmental slide wire device. The inwardly extending portion of the ring 112 is sufficiently short, axially, so as not to abut the flange 97 on the bushing 94. Screws 114 pass through clearance holes in the clamping ring 112 and are threaded into suitable holes in the flange 97 whereby the segmental slide wire device is firmly clamped to the bushing 94. It will be noted in (Figure 3) that the bushing 94 is sufficiently long, outwardly, to permit a second segmental slide wire device (not shown) to be mounted therein adjacent the segmental slide wire device shown. (Only one such segmental slide wire device is shown, for simplicity.) A housing member 115 covers the main and segmental slidewire devices; protecting the elements from dust, dirt, and the like.

The hub portion 93 of the casting 88 carries a pivotal shaft 116 having an L-shaped lever, or arm, 117 attached to the outer end thereof. The shaft is mechanically coupled to the motor 54 for rotation by the motor; the shaft and arm being a part of the mechanical linkage designated, generally, 59, 67 and 71, in Figure 1. The rotatable contact 37 and the brush member 72 are secured to the arm 117 for movement thereof over the main slidewire 31, and the tracks and slide wire of the segmental slide wire device 16, respectively. (It may here be pointed out that in the diagrammatic illustration of Figure 1, the potentiometer resistance wire 31 is shown as a single wire. In actual practice, however, two such wires are used side-by-side and the rotatable contact 37 electrically bridges across the two wires. Consequently, in Figure 3, there are shown two resistance wires 31 and contacts 37.) The contact arms 37 are insulatingly supported on the arm member 117 by screws 118; insulating members 118' being positioned between the screw heads and arm 117. The arm 117 also carries an insulating block 119 upon which the brush member 72 of the segmental slide wire device is mounted. As seen in Figure 2, the insulating block 119 is suitably secured to a plate 121, which, in turn, is mounted on the arm 117 by screws 122. As seen in Figure 3, the brush 72 is suitably secured to a plate 123 which, in turn, is mounted on the insulating block 119 by screws 124. The brush 72, as mentioned in the description of Figure 1, is provided with a pair of brush arms, one of which contacts the conductive track 77, and the other of which contacts either the conductive track 74 or 74', or the segmental slide wire portion 76, depending upon the relative rotary positions of the brush with the tracks and slide wire. A detailed description of the segmental slide wire device 16, including the brush 72 and tracks and resistance wire, is given below.

Reference is now made to Figures 4 and 5 wherein there is shown a rear elevational and a sectional view, respectively, of my novel segmental slide wire device, without the contacting brush 72. The insulating body 73 of the segmental slide wire device (as seen in Figure 5) comprises a pair of identical halves, designated 127 and 127' for purposes of identification in the drawings, joined together in a back-to-back manner. Each portion 127, 127' is provided with an integrally formed, outwardly extending, radial flange 128 which is positioned intermediate the opposite faces thereof. As mentioned above in the description of Figure 3, the insulating body 73, and hence the portions 127, 127' which comprise the body, is provided with an axial aperture 111 for mounting of the device on the recording instrument. Also, shoulder portions 129 are formed on the face of each body portion 127, 127' against which the intermediate flange 97 on the bushing 94, and the flange 113 on the mounting ring 112 abut (as seen in Figure 3) when the device is mounted on the bushing of the recording instrument.

The conductive tracks 74, 74', which are also of identical construction, but are given separate reference characters for purposes of identification, are secured to the flange members 128 of the body halves 127 and 127', respectively, by means of rivets 130; the inside diameter of the tracks being sufficiently large to permit the tracks to abut the flanges. As seen in Figure 5, the apertures through which the rivets extend in the body halves 127, 127' are counter-sunk as at 131 whereby the rivet heads adjacent the center of the body 73 lie within the body halves. The ring contact, or track, 77 is secured to one face of the insulating body 73 (to the body half 127) by means of rivets 132 which extend therethrough. A ring of insulating material 133 is positioned behind the contact ring 77 thereby preventing any possible contact between the contact ring 77 and conductive track 74. The rivets 132 not only attach the contact ring 77 and insulator 133 to the body half 127, but also serve to join the body halves 127, 127' together in an abutting back-to-back manner. When joined together in the above manner, the flange members 128 on the body halves result in the formation of a generally annular channel, designated 134, in the insulating body member 73.

As seen in Figure 4, each of the body halves 127 and 127' is provided with a throat, or cut-out portion, designated 136, along the peripheral edge thereof, which extends to a somewhat greater depth, radially, than the height of the flange portions 128. The conductive tracks 74, 74' are provided with an axial off-set portion, designated 137, which extends through the cut-out portions 136. The ends of the tracks adjacent the off-set portions 137, which ends are designated 138, terminate in the channel 134 formed between the body halves, when the two halves are joined together. The throat, or cut-out portions of the two halves are displaced angularly, and the segmental resistance element 76 positioned in the channel 134 and attached between the ends of the tracks 74, 74' by use of novel end clips 139. The off-set portion 137 of the track 74 through a cut-out 136 in one body half 127 is also shown in Figure 3 of the drawings.

Reference is now made to Figure 6 of the drawings, wherein there is shown an exploded perspective view of a segmental slide wire device. The simplicity of construction and assembly which results by the use of identically-shaped body halves 127, 127', and track members 74, 74', will become apparent upon an examination of Figure 6. The tracks 74, 74' are preferably formed from metal annular ring members of brass or suitable conducting material, by radially cutting or shearing the ring at one point, and off-setting the same adjacent one end an amount shown. The body members 127, 127' are preferably moulded from a plastic insulating material. In the exploded view of Figure 6, the track 74 is shown mounted upon the body portion 127 while the track 74' is shown mounted upon the body portion 127'; each by the use of the rivet members 130. The counter-sunk areas 131 on the member 127 are visible in Figure 6. As viewed in Figure 6, the track member 74' is mounted on the right side of the body portion 127', with the off-set portion 137 of the track extending through the throat portion 136 thereof and terminating on the left side. The track 74, on the other hand, is mounted on the left side of the body portion 127', with the off-set portion 137 extending through the cut-out in the body portion and terminating on the right side thereof. In assembling the device, the cut-out portions 136 are angularly off-set an amount sufficient to permit the resistance element 76 to be mounted between the ends 138 of the tracks. In the assembled condition, the track ends 138 are positioned in the same perpendicular plane to the axis of the device, and the segmental resistance element attached therebetween by means of the end clips 139. The rivet members 132 extend through holes in the body halves 127, 127', the insulating member 133, and in the collector ring 77, to hold the device together.

The lead wires 18, 18' and 18" from the circular track 77, and tracks 74 and 74', respectively, which are shown diagrammatically in Figure 1, are connected in a manner shown best in Figures 4 and 5. Referring again, then, to Figures 4 and 5, one of the rivets 132, which hold the device together, is provided with a terminal lug 141, to which the lead wire 18 is attached. The head of the rivet 132 is in secure physical and electrical contact with the collector ring 77, as seen in Figure 5. Electrical connection is thereby made from the ring 77 to the lead wire 18 through the rivet 132 and terminal lug 141. The lead wire 18' is connected to the track 74, in a manner best seen in Figure 4, wherein a connecting lug 142 is insulatingly secured to the body portion 127' by means of a rivet 143. The lead wire 18' is shown connected to the connecting lug 142. An extension wire 18a extends from the lug 142, through the channel 134 between the body halves, and is soldered, or otherwise suitable secured, to the track 74 adjacent the cut-out portion 136 in the body portion 127, as at 144. The lead wire 18" is simply soldered to the track 74", as shown in Figure 4, as at a point 146 thereon. A hole 148 is located in the body portion 127 adjacent the cut-out portion 136 in the body portion 127' and holes 148' and 148" are coaxially positioned therewith in the insulating member 133 and ring 77, respectively (as seen in Figure 6). The three lead wires 18, 18" extend through these holes. The length of the wires 18, 18' and 18" from the segmental slide wire device is made sufficiently long whereby the device may be easily rotated approximately one complete revolution.

Details of the covel construction of the brush member 72 are shown in Figures 7, 8 and 9 of the drawings. Referring first to Figures 7 and 8, the plate member 123 is shown welded, or otherwise suitably secured to the short-length portion of a rigid L-shaped supporting member 151; the supporting member being shown inverted L-shaped in the drawings. (As shown in Figures 2 and 3, the plate member 123 is secured by a screw 124 to the insulating block 119 in the arm 117.) A first brush arm 152 is secured to the end of the supporting member 151. A second brush arm 153 is attached to the end of a cylindrical stud 154 which, in turn, is secured to the end of the supporting arm member 151 opposite the first brush arm. The brush arms 152 and 153 and the supporting member 151 are staked, or riveted, and soldered to the lug 154. The brush arms are made of a suitable resilient, flexible, metal. A contact element 156 is suitably secured adjacent the end of the brush arm 153 and is adapted to slidably engage the side of the collector ring 77 at all times, as seen in Figure 8.

The brush arm 152 is provided with a vertically oriented portion adjacent the supporting member 151 in which there is formed an aperture 157. The aperture is of a size such that relatively narrow arm portions 158 are formed therein. The free end portion of the brush arm is positioned at right angles to the plane of the vertical portion by providing the brush arm with a right angle bend as at 159. A contact member 161 and a generally U-shaped yoke member 162 are staked, or riveted, and soldered adjacent the free end of the brush arm 152. The yoke member 162 is provided with a pair of slightly concaved, and generally parallel, arm portions 163. The contact member 161 is adapted to slidably engage the contact tracks 74, 74' and the segmental resistance element 76. As viewed in Figure 8, the contact member 161 is in contact with the segmental slide wire element 76.

The brush member 72 is mounted, relative to the slide wire element 76, such that in the normal, center, position of the brush arm 152, the contact 161 is directly over the slide wire element 76, as seen in Fig. 8. In this position, the arm members 163 of the yoke 162 are spaced apart a sufficient distance so as not to contact the segmental slide wire element. In this manner, only the contact element 161 contacts the segmental slide wire element permitting a precise control function with the device.

In order that the contact element 161 may contact the tracks 74 and 74', upon relative rotation of the brush member 72 with the track and resistance element assembly of the slide wire device, it will be apparent that the contact element must move axially of the axis of rotation of the members. The flexibility of the brush member 152, and the yoke member 162 insure the necessary axial movement of the brush end. Reference is made to Figure 9, which is similar to Figure 8, only showing the contact 161 engaging the track 74. The arms 163 of the yoke member 162 straddle the track 74 and axially displace the free end of the brush arm, thereby causing the contact element 161 to contact the track. As seen in broken lines, in Figure 9, the brush arm 162 and attached contact 161 are displaced in the opposite direction when contacting the track 74'. No adverse effects result in the operation of the device through electrical contact of the leg portions of the yoke member with the tracks, as the tracks are highly conductive. The exact point of electrical contact with the tracks is, therefore, of no significance. As pointed out above, however, the slide wire element 76 is located directly opposite the contact 161 when the brush 152 is in the normal, unbiased, center position whereby only the contact 161 engages the segmental slide wire. The aperture 157 adjacent the fixed end of the brush arm 152 allows easy axial flexure of the brush, and localizes the flexure to the narrow arms 158.

The contact 156 is directly connected to the contact 161 through the connecting brush arms and connecting lug 154. The contact 156 makes continuous contact with the collector ring 77, which ring, in turn, is connected through the lead wire 18 to the control network (as seen in Figure 1). The contact 161, on the other hand, is adapted to contact either of the conductive tracks, while straddling the peripheral portion of the latter, 74 or 74', or the segmental slide wire element 76. The tracks 74 and 74', as shiwn in Figure 1, are connected to the control network through lead wires 18' and 18", respectively. Thus, it will be understood, that while the contact 161 engages the segmental slide wire element 76, a proportional control of the temperature of the furnace is effected. When the contact 161 engages either the conductive track 74 or 74', proportonal control of the temperature ceases, due to the high conductivity of the tracks.

Reference is now made to Figures 10 and 11, wherein there are shown views of the segmental slide wire element 76 with the end clips 139 attached thereto. An insulated resistance wire 171 is wound around an arcuate-shaped, plane, supporting member 172 of insulating material. (The insulation on the wire 121 is removed on the outer peripheral edge thereof for electrical contact with the contact element 161 on the brush arm 152.) The supporting member 172 is provided with extended portions 173 to which end clips 139 are glued, cemented, crimped, or otherwise suitably secured. As seen in Figure 11, which is taken on line 11—11 of Figure 10, the end clips 139 are of a U-shape, fitting over the edge of the end portions 173 of the supporting member 172. The end clips abut the resistance wire winding 171, and the top edge of the clips are substantially flush with the top edge of the adjacent turn of the resistance wire, thereby providing a smooth surface for the contact as it passes thereover. The ends of the wire winding 171 are soldered between tab members 174 extending from the end clips 139.

The segmental slide wire, with the attached end clips, is easily installed between the two tracks 74, 74'. To install the assembly to the tracks, the tracks are notched as at 176, to a depth wherein the top edge of the clips are substantially flush with the top edge of the adjoining track for smooth operation of the contact thereover. Before soldering, or otherwise suitably securing the clips to the tracks, the corner of the clip is cut, or filed, off as indicated at 177 (as shown by the clip on the left end cf the resistance element of Figure 10). The corner is cut, or filed, off the proper amount to effect a proper fit of the segmental slide wire element to the tracks, wherein substantially no gap is formed at the top of the connection between the clip and tracks.

It will be understood that with my novel resistance element construction, the resistance element 76 along with the attached end clips, may be manufactured as a subassembly, which may be easily and quickly installed between the two tracks 74, 74' by first clipping, or filing, the end clips as indicated, to make a proper joint with the tracks, and then soldering the clips to the tracks along the edge of the clips. As seen in Figure 4, the outer edge of the tracks and resistance element extend outwardly beyond the body portions engaging the periphery of said track 127, 127' of the device whereby the clips may be easily soldered to the tracks when the tracks are assembled with the body halves, and the body halves are riveted together along with the collector ring 77. Thus, it will be seen that a worn or improperly functioning resistance element may be quickly removed and replaced with a new element with a minimum of effort.

As seen in Figure 2, the main potentiometric slide-wire 31 is in the form of an arc of slightly less than 360 degrees; the full active span of the main slide wire being approximately 340 degrees, which corresponds to the effective length of the scale 69 shown in Figure 1. The segmental slide wire device 16 is positionally adjustable within the entire 340 degree range of the main slide wire for proportioned control at any point within the range. Therefore, if the segmental slide wire device is set at the lower end of the scale, the contact arm 37 on the main slide wire, and brush arms 152 and 153 on the segmental slide wire device must be free to move in the up-scale direction the full 340 degrees and when the segmental slide wire device is set at the upper end of the scale, the contact and brush arms must be free to move in the downscale direction the full 340 degrees. It is seen, then, that the rotational range of the segmental slide wire brushes on the segmental slide wire tracks and resistance wire must be about twice the angular extent of the main potentiometric slide wire, or 680 degrees. In the segmental slide wire device shown in the drawings, and described above, the tracks 74 and 74' are each approximately 360 degrees and the resistance element 76 approximately 70 degrees, thereby resulting in a path length of approximately 790 degrees as presented to the contacting brush 152, which length is entirely adequate. There is no limit upon the relative rotation between the brush 153 and collector ring 77, obviously.

It will be noted that the contact arm 37 for the main slide wire and the brush arms 152 and 153 for the segmental slide wire are all mounted upon the lever, or arm 117, which is driven directly by the shaft 116. (See Figure 3.) There is no mechanical linkage, such as gearing, or the like, between the main slide wire mechanism and the segmental slide wire mechanism, as is used in many contemporary control instruments. The integral drive from the shaft 116 to the main and segmental slide wire devices results in a system having no back lash or lost motion, whereby extremely accurate performance of the system is possible.

In the operation of the device, the segmental slide wire device is rotatably positioned with respect to the main slide wire to provide a proportional control function at any desired point within the arcuate length of the main slide wire. If the temperature of the furnace is outside of the proportional control range, either below or above, the contact 161 on the brush 152 will engage one, or the other, of the tracks 74, 74'. The control network 14 may be designed to provide full current to the heating element 11 if the temperature of the furnace is below the control range, or to completely cut-off the current thereto if the temperature is above the control range. When the temperature of the furnace reaches the control range of the segmental slide wire device, the contact 161 engages the resistance element 76 of the device and proportional control is effected.

It will be apparent that the arcuate length of the slide wire element 76 is not limited to the length of approximately 70 degrees which is illustrated. Any suitable length segmental slide wire may be used by properly fixing the angular distance between the throat portions 136 on the body halves.

Having now described my invention in detail in ac- cordance with the requirements of the patent statutes, various other changes and modifications will suggest themselves to those skilled in this art. It is intended that such changes and modifications shall fall within the spirit and scope of the invention as recited in the following claims.

I claim:

1. A segmental slide wire device comprising a pair of coaxially mounted and axially displaced conductive track members each having a generally circular-shaped periphery; one end of each of the said track members being axially displaced and positioned in a spaced end-to-end relation; and a resistance element connected between the said spaced ends of the track members.

2. The invention as recited in claim 1 including a generally annular-shaped conductive collector ring coaxially mounted a spaced axial distance from the said track members.

3. The invention as recited in claim 1 including U-shaped end clips joining the said track members and resistance wire ends together.

4. A segmental slide wire device comprising a generally cylindrical-shaped insulating body member having a pair of spaced radially extending flanges integrally formed thereon, means forming a cut-out portion on each of the said flanges, the said cut-out portions being angularly displaced, a pair of conductive track members mounted on the outer faces of the said flanges, one end of each of the said track members extending through the said cut-out portions and terminating in a spaced end-to-end relation between the said flanges, and a resistor element connected between the said spaced ends of the said track members.

5. The invention as recited in claim 4 wherein the said body member comprises a pair of substantially identically-shaped, cylindrical body portions joined together.

6. A segmental slide wire device comprising a pair of insulating body members with coaxial apertures to receive a carrying shaft; a pair of conductive tracks disposed in axially displaced positions on the said insulating body members, the said tracks being generally circular in shape and each having one end displaced axially, the said axially displaced ends being positioned in a spaced end-to-end relation; a resistance element connected between the said spaced ends of the said tracks; and means joining the said pair of body members together.

7. The invention as recited in claim 6 including a resilient brush rotatable about the said tracks and resistance element, a brush contact attached to the said resilient brush adjacent the free end thereof and adapted to slidably contact the said tracks and resistance element, the free end of the said brush being movable axially through contact with the said tracks.

8. A segmental slide wire device comprising a pair of generally identical cylindrical-shaped insulating body members and having a radial flange integrally formed thereon, means forming a peripheral cut-out portion on the said body members, means attaching the said body members together in a back-to-back manner, a pair of generally circular-shaped conductive tracks attached to the outer sides of the said flange members and having a portion extending through the said cut-out portions, and a resistance element positioned between the said flange members and connected between the said track members.

9. A segmental slide wire device comprising a pair of generally cylindrical-shaped insulating body members of substantially identical shape, each of the said body members having a radial flange integrally formed thereon, means forming a cut-out portion on the periphery of each body member, the said cut-out portions being angularly displaced, means joining the said body members together in a back-to-back manner wherein an annular channel is formed by the said flange members at the periphery of the said body members, a pair of generally circular-shaped conductive tracks attached to the outer sides of the flanges on the body members, each of the said tracks having an axially displaced portion extending through the said cut-out portions and terminating in a spaced end-to-end position in the said channel, and a resistance element positioned in the said channel and connected between the said spaced track members.

10. In a segmental slide wire device, a generally arcuate-shaped conductive track having an axially displaced portion thereon, a brush member including an axially displaceable resilient arm portion engaging the periphery of said track, the said track and brush members being relatively rotatable about a common axis, and means maintaining contact between the said brush and track during relative rotary movement therebetween.

11. The invention as recited in claim 10 wherein the said resilient arm portion of the said brush includes a section positioned in a plane perpendicular to the said common axis, and means forming an aperture in the said section, axial flexure of the said brush being greatest adjacent the said aperture.

12. The invention as recited in claim 10 wherein the said means maintaining contact between the said brush and track during relative rotary movement therebetween includes a pair of spaced and generally parallel arm members attached to the said brush member adjacent the end thereof, the said parallel arm members being positioned on opposite sides of the said track member.

13. In a segmental slide wire device, first and second mounting members relatively rotatable about a common axis, a generally circular-shaped conductive track having an axially displaced portion thereon mounted on the said first mounting member, a brush member including a resilient arm portion mounted on the said second member, a pair of generally parallel axially displaced arm members mounted on the said brush member adjacent the free end thereof and positioned on opposite sides of the peripheral edge portion of said track, the said arm members being adapted to maintain contact between the said brush member and track during relative rotary movement therebetween.

References Cited in the file of this patent

UNITED STATES PATENTS

| | | |
|---|---|---|
| 2,177,291 | Schellenger | Oct. 24, 1939 |
| 2,463,045 | Mucher | Mar. 1, 1949 |
| 2,712,583 | Mucher | July 5, 1955 |
| 2,729,728 | Koenig | Jan. 3, 1956 |